(12) United States Patent
Anderson et al.

(10) Patent No.: US 7,147,684 B2
(45) Date of Patent: Dec. 12, 2006

(54) DEVICE FOR FILTERING PARTICLES OUT OF A COOLANT FLOW IN A TURBO MACHINE

(75) Inventors: Gordon Anderson, Baden (CH); Marcel Koenig, Wettingen (CH)

(73) Assignee: Alstom Technology Ltd., Baden (CH)

( * ) Notice: Subject to any disclaimer, the term of this patent is extended or adjusted under 35 U.S.C. 154(b) by 58 days.

(21) Appl. No.: 10/829,378

(22) Filed: Apr. 22, 2004

(65) Prior Publication Data

US 2004/0221720 A1 Nov. 11, 2004

Related U.S. Application Data

(63) Continuation of application No. PCT/IB02/04332, filed on Oct. 18, 2002.

(30) Foreign Application Priority Data

Oct. 23, 2001 (CH) .................................. 1949/01

(51) Int. Cl.
*B01D 45/06* (2006.01)

(52) U.S. Cl. .................. 55/385.1; 55/394; 55/434; 55/462; 55/DIG. 14

(58) Field of Classification Search ............... 95/272; 55/394, 434, 447, 458, 462, 463, DIG. 14, 55/385.1
See application file for complete search history.

(56) References Cited

U.S. PATENT DOCUMENTS

| | | | |
|---|---|---|---|
| 890,537 A | | 6/1908 | Stanley |
| 4,076,508 A | * | 2/1978 | Christensen .................. 55/309 |
| 4,389,227 A | * | 6/1983 | Hobbs .......................... 55/306 |
| 4,772,299 A | * | 9/1988 | Bogusz ....................... 55/385.3 |
| 4,820,122 A | | 4/1989 | Hall et al. |
| 5,152,134 A | | 10/1992 | Boyd et al. |

FOREIGN PATENT DOCUMENTS

| | | |
|---|---|---|
| EP | 60205126 | 10/1985 |
| GB | 2 270 481 A | 3/1994 |
| GB | 2 342 124 A | 4/2000 |
| WO | 03/036051 A1 | 5/2003 |

OTHER PUBLICATIONS

Search Report from PCT/ IB 02/ 04332 (Jan. 28, 2003).
Search Report from CH 19492001 (Feb. 14, 2002).

* cited by examiner

*Primary Examiner*—Robert A. Hopkins
(74) *Attorney, Agent, or Firm*—Cermak & Kenealy, LLP; Adam J. Cermak

(57) ABSTRACT

For preparing a gas stream cleaned from dust and dirt particles, a device is proposed in which an outflow channel (2) for cleaned medium has at its mouth in an inflow channel (1) an extension element (4), which projects into the inflow channel. A cover element (6) covers an end inflow aperture (4a) of the extension element. In an embodiment of the invention, the extension element (4) has lateral inlet apertures (5). The cover element (6) is preferably constituted hood-shaped, and has axial extension elements (6a), which at least partially cover the extension element (4) in the axial direction, and advantageously extend over the lateral inlet apertures. The stream entering the outflow channel (2) for cleaned medium must overcome strong flow deflections, so that particles with a low flow following ability cannot get into this channel. Further outflow channels (3) for conducting the remaining dust-laden medium are arranged substantially flush with the wall (7) of the inflow channel.

12 Claims, 2 Drawing Sheets

DEVICE FOR FILTERING PARTICLES OUT OF A COOLANT FLOW IN A TURBO MACHINE

This application is a Continuation of and claims priority under 35 U.S.C. § 120 to International application number PCT/IB02/04332, filed 18 Oct. 2002, and claims priority under 35 U.S.C. § 119 to Swiss application number 2001 1949/01, filed 23 Oct. 2001, the entireties of both of which are incorporated by reference herein.

BACKGROUND OF THE INVENTION

1. Field of the Invention

The present invention relates to a device for filtering particles from a stream.

2. Brief Description of the Related Art

A sufficient and reliable cooling of components of a flow machine represents an essential aspect for the operation of the flow machine. Modern high temperature gas turbines require a cleverly thought out cooling system to obtain a high efficiency, in particular for cooling the highly loaded turbine blades. The turbine blades therefore have cooling channels, or cavities passing through them and forming cooling channels, through which a cooling medium, particularly cooling air, streams during the operation of the plant. In the leading edge region of the turbine blades, at their forward edge, as a rule numerous cooling air bores are provided, through which the cooling medium can pass outward from the blade interior. A cooling air film forms on the surface in this region, and protects the turbine blade from excessive heating. In the same way, corresponding cooling air bores are also present on the rear edge, the pressure side, and the suction side of the turbine blade and also on other components of the flow machine.

The cooling air is supplied to the cooling channels via one or more supply channels, which for example can be formed by an annular interspace present between the combustion chamber and the external housing of the flow machine. The cooling medium is as a rule a portion of the air compressed by the compressor stage or conducted past this.

A problem in the operation of such a cooling system of a flow machine is represented by the blocking of the cooling channels or cooling air bores by dirt or dust particles which can arise from the atmosphere or from components located upstream of the cooling channels, and brought with the cooling medium into the cooling channels. Blocking of individual cooling channels or cooling air bores can lead to a considerable increase of the local temperature loading of the components to be cooled until they are damaged. This problem is additionally accentuated in that the cooling air bores are increasingly made smaller to increase the efficiency of the cooling system, so that they can more easily become blocked.

For reducing the risk of blockage of cooling channels or cooling bores, it is known to provide additional dust extraction apertures at cooling channel deflections. Particles entrained in the cooling medium are extracted from the cooling medium circuit due to their inertia by means of these dust extraction apertures, so that blockage of the downstream cooling channel bores by these particles is prevented.

An example of an embodiment of a turbine blade with such dust extraction apertures is for example to be gathered from U.S. Pat. No. 4,820,122. The interior of the turbine blade here has cooling channels running in a serpentine manner. The branching into the individual channels already occurs in the region of the entry of the cooling medium into the turbine blade at the rotor. A straight channel extends radially in direct extension of the inlet channel, and leads directly to a dust extraction aperture at the blade tip. The particles entering with the cooling air are forwarded, due to their inertia, directly in a straight line radially of this dust extraction aperture, while nearly dirt-free cooling air can enter without problems into the other, serpentine-like channels. The dirt particles are thus conducted through this dust extraction aperture into free space, so that the cooling air bores cannot be blocked by the dirt particles.

A disadvantage of this technique however consists in that a portion of the cooling medium also emerges through the dirt extraction apertures, so that with this system an undesired loss of cooling medium occurs in the cooling circuit.

It is furthermore known to arrange separators, for example cyclones, within the cooling system to separate the dirt or dust particles from the cooling medium. In these separators, vortices are produced in the cooling medium and the dust and dirt particles, due to their inertia, can be separated off by them from the cooling medium.

A disadvantage of these separators consists in that they require additional constructional space, which is not available in cooling systems for given components to be cooled. Separators are therefore frequently used for applications in which the cooling air is conducted out of the inner region of the flow machine, purified outside the inner region in the separator, and can then be conducted back into the inner region to fulfill the cooling function. Furthermore, cyclones cause a considerable pressure loss and also require an additional cleaning step.

JP 60-205126 describes an apparatus in which an outflow channel with an extension element projects into an inflow channel. The stream cross section of the inflow channel is larger at the place of the opening of the extension element than the stream cross section of the extension. A local acceleration of the stream thereby results, and heavy dust particles, which do not easily follow the stream, enter the outflow channel in a reduced amount. Due to the direct and only slightly curved inflow into the extension element, however, a dust entrainment into the outflow channel which is negligible in all circumstances is not always to be counted on in all circumstances; for example, in the said applications for dust separation in cooling air, according to the place of use of the purified cooling air, one is to go out from an actual null tolerance of dust particles.

SUMMARY OF THE INVENTION

Starting from this prior art, an aspect of the present invention includes providing a device for filtering out particles from a stream which avoids the disadvantages of the prior art, and which in particular, when used in a cooling system of a flow machine, reduces the risk of a blocking of the cooling channels or cooling air bores by dirt or dust particles, requires no additional constructional space in the flow machine, and—at least in one mode of operation of the device—brings about no loss of cooling medium or of air pressure.

The present device for filtering particles from a stream has an inflow channel for the inlet and at least one outflow channel opening into the inflow channel for outlet of the stream, the outflow channel having a channel-form extension element at the transition from the inflow channel, with its free end extending into the first channel. The present device is distinguished in that a cover element is arranged on the free end of the extension element projecting into the inflow channel, and covers the end inflow aperture of the channel-form extension element at the end.

The core of the invention is thus to prevent, by the arrangement of the cover element, a straight-line inflow into the extension element and thus into the outflow channel for purified medium, and according to the embodiment, to compel strong stream deflections as far as a labyrinthine stream. Only the smallest aerosols, if any at all, can thus penetrate into the outflow channel. The separation effect is stronger, the more prominent the stream deflections. The separation device according to the invention thus causes comparatively small pressure losses.

This device can be embodied particularly simply if the outflow channel and/or the extension element have a smaller cross section than the inflow channel. In a preferred embodiment, the stream cross section of the extension element is constant over its whole axial extent, and is preferably equal to the stream cross section of the outflow channel. Both likewise preferably have an identical stream channel geometry when the outflow channel for purified medium and the extension element run coaxially.

In an embodiment of the invention, the inflow channel forms an expansion chamber, and the extension element projects into the expansion chamber.

By this embodiment of the present device it is attained that a large fraction of the dirt or dust particles present in the stream do not stream into the second channel but, due to inertia, are collected in a region surrounding the inlet aperture of the second channel and formed between the channel-form extension element and the wall of the first channel, or, in a preferred embodiment, are drawn off from there via one or more outflow channels for dust-laden medium.

In this preferred embodiment, at least one further outflow channel branches from the inflow channel, advantageously in a region of axial covering of the inflow channel and the extension element, and opens into the inflow channel, flush with its wall. This makes it possible for the dust or dirt particles to be sucked away via these channels. Preferably, the outlet channels for dust-laden medium—when the device is used in a cooling system of a flow machine—lead to further cooling channels, for example for cooling the combustion chamber, which do not tend to blocking by dirt or dust particles, and are thus insensitive to these particles. In this manner, no cooling medium is lost from the cooling system; all of the medium supplied by means of the inflow channel is supplied for cooling. The branching of further outflow channels is preferably arranged in a region of the inflow channel over which the extension element extends in the axial direction or respectively the extension element is to have a corresponding length.

An embodiment according to the invention is offered with a transition between the supply channel or supply plenum, particularly the interspace in a gas- or steam turbine plant, located between the combustion chamber and the outer housing, and the individual cooling channels of a flow machine. Such extension elements can of course also be provided at other places of the cooling system, at which a first channel of greater stream cross section goes over into a second channel of smaller stream cross section. The cross section transition can also be formed throughout with a transition from an expansion chamber arranged in the stream path into a following downstream stream channel; the channel cross section upstream of the expansion chamber is then completely without significance.

The measures realized by the present invention for reducing the introduction of dust or dirt particles with the stream has the particular advantage that it requires no additional space within the flow machine when integrated into a flow machine. Only the space already present or the plenum already present of the channel with large cross section is used. Furthermore no substantial pressure drop in the cooling system is caused by the extension element.

An extension element is preferably tubular, corresponding to the cross sectional shape of the at least one outflow channel for purified medium. Preferably an extension element has the same cross section over the whole length. However, deviations from this can of course occur, as for example a slightly funnel-shaped form of the extension element, as long as the desired dust or dirt reducing effect is still attained.

In an embodiment of the invention, the cover element is arranged spaced in the axial direction of the extension element from the end of the extension element. A gap is then formed between the cover element and the extension element, and the stream in it can reach only a chicane form of stream path. In an alternative embodiment of the invention, the channel-shaped extension element is closed at its free end projecting into the inflow channel.

In an advantageous development of the invention, the extension element has at least one laterally arranged inlet aperture for the flow medium.

It is furthermore advantageous if the cover element is formed of hood shape and at least partially covers the extension element axially. This is exactly effective when the axial covering of the hood-shaped cover element extends over the facultative lateral inlet aperture. The hood-shaped form of the cover element with an axial covering of the extension element requires a yet stronger curvature of the path of motion of the particles entrained with the streaming medium, in order to be able to enter the inlet aperture of the extension element. By this embodiment, an additional reduction of the entry of dust or dirt particles into the outflow channel is attained, since these particles, due to their inertia, cannot completely follow the strongly curved path of movement by which they can reach the inlet aperture of the extension element.

The invention is particularly suitable for filtering out and separation of particles from a gaseous stream.

Still other aspects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The present device is described hereinafter, without limitation of the general inventive concept, in a cooling system of a flow machine, based on embodiment examples in connection with the accompanying drawings.

DETAILED DESCRIPTION OF THE PREFERRED EMBODIMENTS

Figure 1:
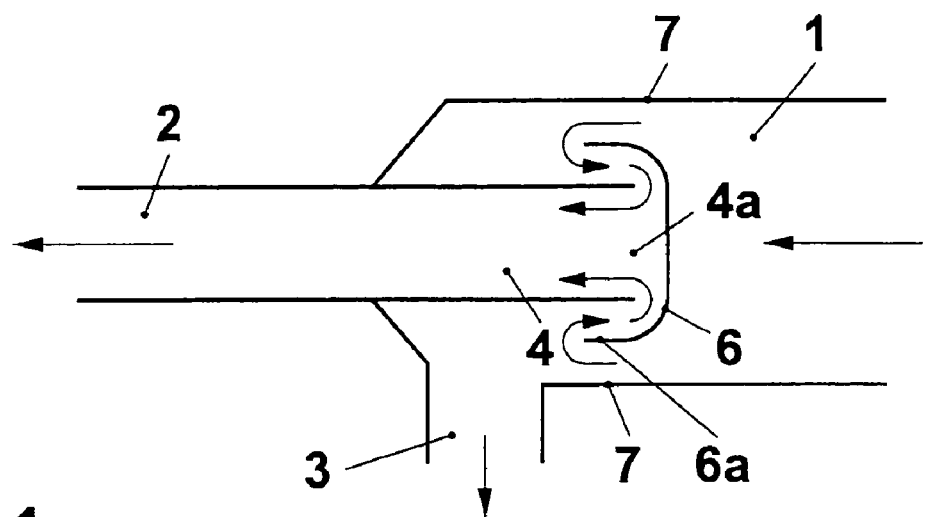
FIG. 1 shows a first example of an embodiment of the invention.

Referring to the drawing figures, like reference numerals designate identical or corresponding elements throughout the several figures.

FIG. 1 shows a first embodiment example of a device according to the invention. For example, a strongly schematized excerpt of the cooling system of a gas turbine is concerned. An inflow channel 1 is formed in a machine, for example an annular interspace between the combustion chamber wall and the machine housing, which is strongly schematized in the Figure and shown in section. The device has a stream through it in accordance with requirements in the direction of the arrows. A particle-laden medium stream is supplied to the device through the inflow channel 1. In the inflow channel 1 there open at least an outflow channel 2 and at least one further outflow channel 3. The further outflow channel 3 opens into the inflow channel 7, substantially flush with its wall. The first outflow channel 2 is an outflow channel for purified medium. It has an extension element 4 which projects into the inflow channel 1. The mouth of the further outflow channel 3 for dust-laden medium is advantageously axially covered by the extension element 4. The extension element 4 has at its free end an end inflow aperture 4a. This is covered by a cover element 6. In the preferred embodiment shown, the cover element 6 is hood-shaped, formed with lateral extension elements 6a. According to the invention, this does not necessarily have to be so; according to the invention, a flat plate is in principle completely sufficient as a cover element for the desired effect. However, if the cover element is formed hood-shaped, and with the extension elements 6a has an at least partial axial covering with the extension element 4, the separation effect is improved. It can be seen that due to the constitution of the present configuration, a media stream has to follow a chicane-form stream path in order to reach the outflow channel for purified medium 2 through the end inflow aperture 4a. Only aerosols with the best ability to follow a stream can complete the two sharp stream deflections, so that no coarse dirt and dust particles can reach the outflow channel 2. From the outflow channel 2 outward, dust-sensitive media users, such as for example the cooling air channels of a turbine blade, can with advantage be supplied. The coarse dust and dirt particles are collected in the space surrounding the extension element 4, and can be supplied via the outflow channel for dust-laden medium 3 for a use having low purity requirements for the medium, such as for example the cooling of a gas turbine combustion chamber. The form of this cover element 6 is of course not limited to the form shown at present; for example, conical shapes can be selected, as long as the resulting effect is ensured, i.e., that the entry of dirt or dust particles on direct, straight-line paths is prevented with the stream in the extension element.

Figure 2:
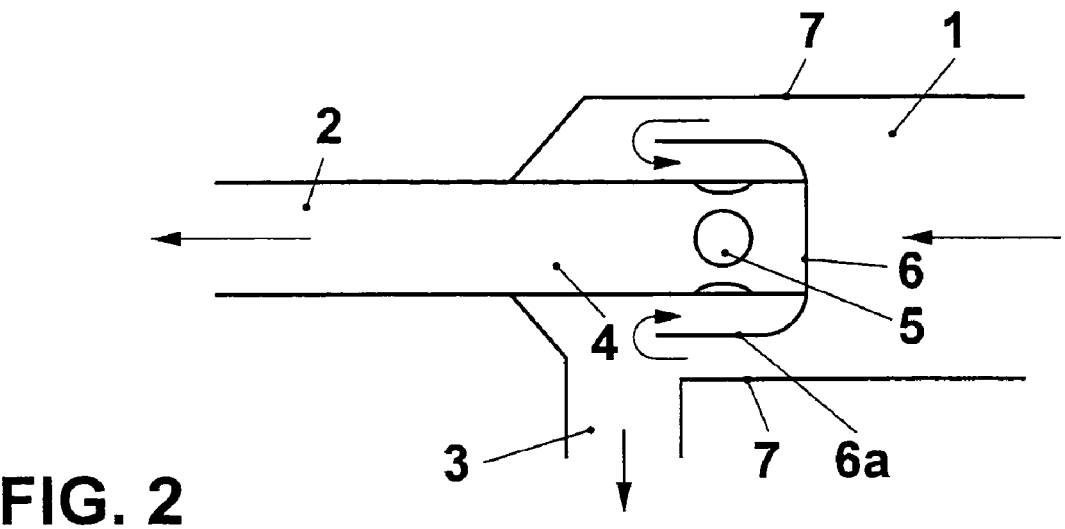
FIG. 2 shows a further example of an embodiment of the invention.

FIG. 2 shows a further embodiment of the present device shown in the same style of illustration as the preceding Figures. In this embodiment, the extension element 4 is closed at its end 4a projecting into the outflow channel 1, and is completely closed by the cover element 6. The medium streams via apertures 5 at the sidewalls of the extension element 4 into this. Also it is hereby prevented that dust and dirt particles can enter the channel 2 with the cooling medium on a direct, straight-line path. In order to reach the outflow channel 2, particles again must follow a strongly curved path, which however only the finest aerosols with a small inertia and correspondingly large stream following ability provide. Larger and heavier particles are again conducted away via the further outflow channel 3. This separation mechanism is additionally supported by the hood-shaped design of the cover element 6 with a covering of the lateral apertures 6.

Figure 3:
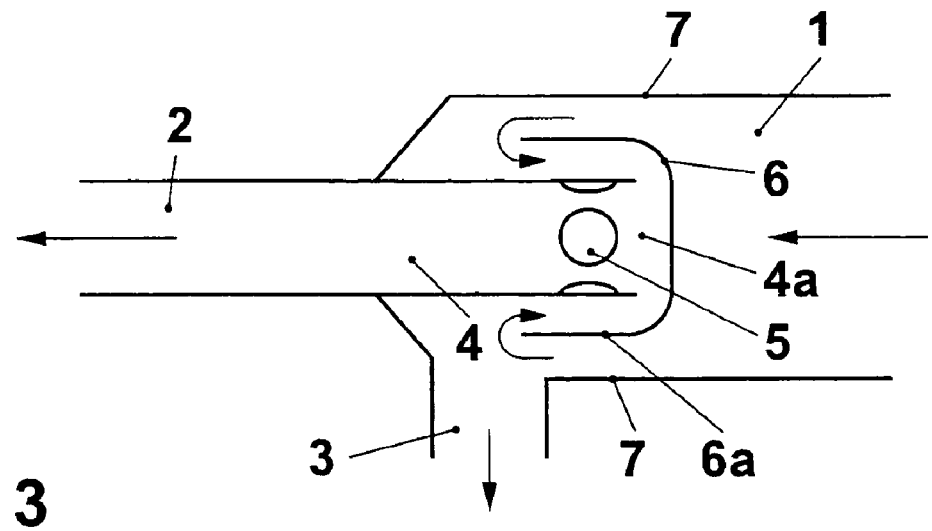
FIG. 3 shows a third preferred embodiment of the invention.

FIG. 3 shows a combination of the embodiments described hereinabove, and is distinguished because of the totality of enlarged passage cross sections in the extension element 6 by particularly small pressure losses.

Figure 4:
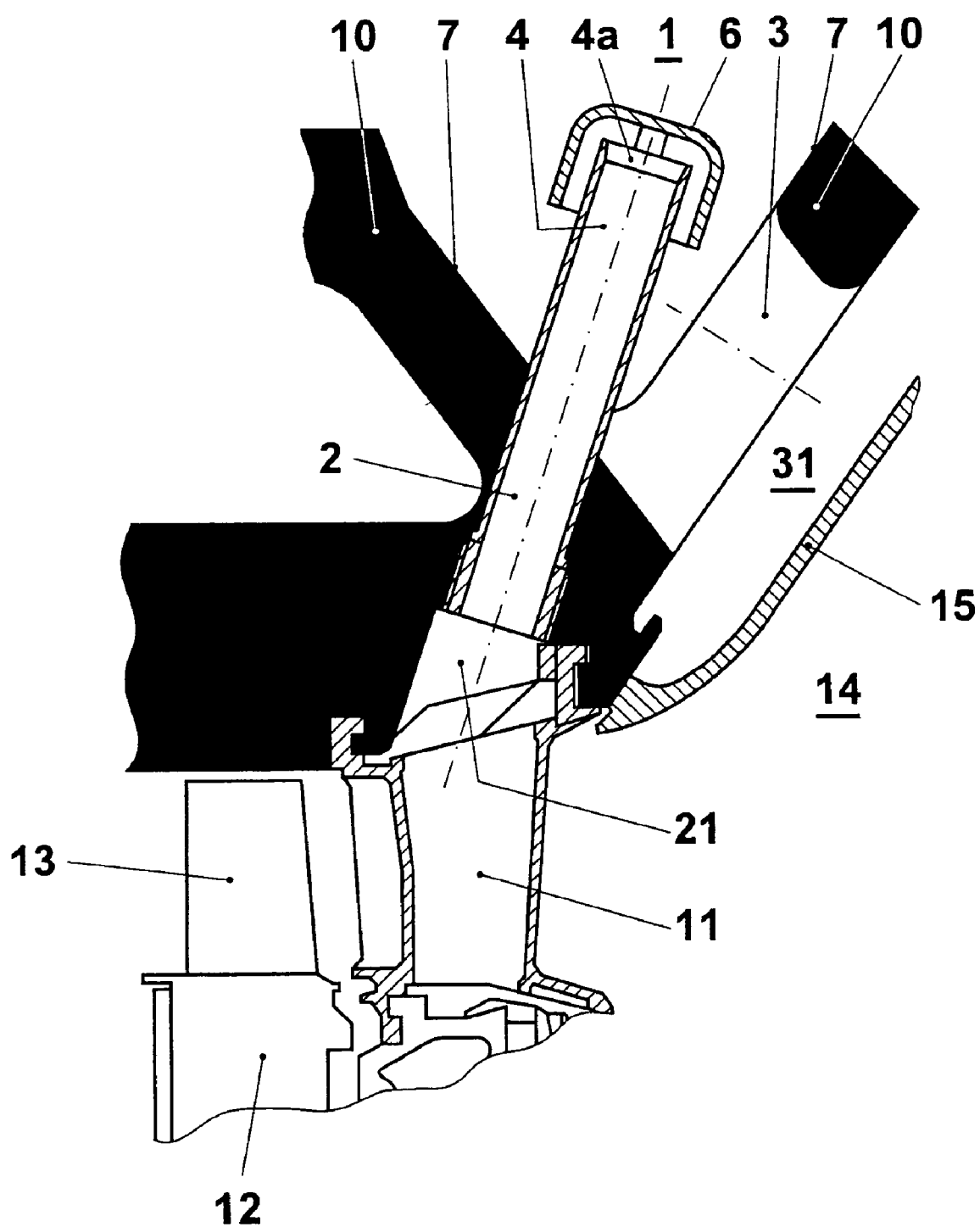
FIG. 4 shows an example of the realization of the present device in the cooling system of a gas turbine plant.

FIG. 4 shows finally an example of a realization of the present device in the cooling system of a gas turbine plant. The Figure shows in cross section an excerpt of a gas turbine plant. All elements not essential for the understanding of the invention are omitted from the Figure. A portion of the housing 10, the combustion chamber 14 with the combustion chamber wall 15, a first guide vane 11 of the turbine, and a rotor disk 12 with a rotor vane 13 are shown with reference numerals. A plenum formed in the housing functions as an inflow channel 1 for cooling air. A cooling air channel 21 is for guiding cooling air to guide vanes 11. High purity requirements are placed on this cooling air, since the cooling air outlet openings of a vane 11 are as a rule the finest film cooling apertures. In the cooling air entering the cooling air channel 31, on the contrary, comparatively coarse dust loadings are tolerable, since with the cooling of combustion chamber wall segments 15 all cooling air passage cross sections are dimensioned quite large. The detailed design of the cooling of the vanes and combustion chamber wall is not shown in this Figure, but are immediately familiar to one skilled in the art. The cooling air channel 21 is fed from an outflow channel 2, which in its turn is designed so that an extension element 4 projects into the plenum or respectively the supply channel 1. The extension element 4 has at its free end an end inlet aperture 4a which, according to the invention, is covered by a hood-shaped cover element 6 so that a straight-line inflow of cooling medium into the extension element 4 and the outflow channel 2 is prevented. In the above-described manner, it is ensured that the cooling air streaming into the cooling channel 21 has no critical dust loading. Dust-laden air, which is conducted away by means of the outflow channel 3 opening flush with the channel wall 7 in the inflow channel 1, can in principle be supplied to arbitrary uses, as long as the dust loading is not critical for these uses. Thus this air could be conducted directly into the turbine or into the combustion chamber. However, the cooling air was in general already prepared upstream of the region of the cooling system shown, for example, coarse-filtered and cooled. Rejection of a not inconsiderable partial stream is therefore to be evaluated negatively. It is therefore represented, to conduct the dust-laden cooling air from the further outflow channel 3 into a cooling channel 31, from which the really dust-insensitive cooling of the combustion chamber wall 15 is supplied with cooling air. In the Figure, on account of the cross sectional representation, respectively only one of the elements, i.e. the channels 2, 3, 21 and 31, extension element 4 or guide vane 11, is seen. A great number of these elements or components is however arranged with rotational symmetry in a well known manner around the rotor axis of the turbine. With such a design of a cooling system, the amount of dust and dirt particles which enter the cooling channels for the high pressure turbine vanes can be reduced, and the associated pressure losses can be minimized.

The device according to the invention can of course be used for other, for example gaseous, streams from which particles are to be filtered.

| List of Reference Numerals | |
|---|---|
| 1 | inflow channel |
| 2 | outflow channel, for purified fluid |
| 3 | outflow channel, for dust-laden fluid |
| 4 | extension element |
| 4a | end inflow aperture of the extension element |
| 5 | lateral inlet apertures |
| 6 | cover element |
| 6a | axial extension element of the cover element |
| 7 | wall of the inflow channel |
| 10 | housing element of the gas turbine |
| 11 | guide vane |
| 12 | rotor disk |
| 13 | running vane |
| 14 | combustion chamber |
| 15 | combustion chamber wall |
| 21 | cooling air channel |
| 31 | cooling air channel |

While the invention has been described in detail with reference to preferred embodiments thereof, it will be apparent to one skilled in the art that various changes can be made, and equivalents employed, without departing from the scope of the invention. Each of the aforementioned documents is incorporated by reference herein in its entirety.

What is claimed is:

1. A device for filtering particles from a stream, comprising:
   an inflow channel for the inlet of the stream and at least one outflow channel opening into the inflow channel for the outlet of the stream, the at least one outflow channel having a channel-shaped extension element which extends with a free end into the inflow channel, the extension element including an end inflow aperture;
   a cover element positioned at the free end of the extension element which covers the end inflow aperture of the extension element at the end of the free end, such that a straight-line inflow into the extension element is prevented;
   wherein the cover element is hood-shaped and axially at least partially covers the extension element.

2. A device according to claim 1, wherein the cover element is arranged spaced upstream of the end of the free end of the extension element.

3. A device according to claim 1, wherein the cover element closes the end inflow aperture.

4. A device according to claim 1, wherein the extension element comprises at least one laterally arranged inflow aperture.

5. A device according to claim 1, wherein the extension element comprises at least one laterally arranged inflow aperture, and wherein the cover element extends axially over the at least one laterally arranged inflow aperture of the extension element.

6. A device according to claim 1, wherein the inflow channel includes a wall, and further comprising:
   at least one additional outflow channel having an opening substantially flush with the inflow channel wall.

7. A device according to claim 1, wherein the extension element extends over a distance in the inflow channel which at least corresponds to a diameter of the at least one outflow channel on which it is arranged.

8. A system comprising:
   a flow machine including a cooling system; and
   a device according to claim 1 positioned in said cooling system.

9. A system according to claim 8, further comprising:
   at least one dust-sensitive cooling channel in said cooling system;
   at least one additional outflow channel; and
   stream channels which are insensitive to dust or dirt particles;
   wherein the at least one outflow channel is connected to the at least one dust-sensitive cooling channel, and wherein the at least one additional outflow channel is connected to said stream channels.

10. A system according to claim 8, further comprising:
    guide vanes and running vanes, the vanes comprising cooling channels; and
    wherein the at least one outflow channel is in flow connection with said vane cooling channels.

11. A system according to claim 8, wherein said flow machine comprises a gas turbine plant, a steam turbine plant, or both.

12. A system according to claim 9, wherein the stream channels comprise cooling channels.

* * * * *